(12) United States Patent
Boudou et al.

(10) Patent No.: US 11,988,560 B2
(45) Date of Patent: May 21, 2024

(54) LOW THERMAL CAPACITY MICRO-BOLOMETER AND ASSOCIATED MANUFACTURING METHOD

(71) Applicant: LYNRED, Palaiseau (FR)

(72) Inventors: Nicolas Boudou, Grenoble (FR); Sébastien Cortial, Sassenage (FR)

(73) Assignee: LYNRED, Palaiseau (FR)

( * ) Notice: Subject to any disclaimer, the term of this patent is extended or adjusted under 35 U.S.C. 154(b) by 355 days.

(21) Appl. No.: 17/611,830

(22) PCT Filed: May 11, 2020

(86) PCT No.: PCT/FR2020/050763
§ 371 (c)(1),
(2) Date: Nov. 16, 2021

(87) PCT Pub. No.: WO2021/009421
PCT Pub. Date: Jan. 21, 2021

(65) Prior Publication Data
US 2022/0228917 A1    Jul. 21, 2022

(30) Foreign Application Priority Data

Jul. 16, 2019 (FR) .................................... 1907993

(51) Int. Cl.
*G01J 5/02*  (2022.01)
*G01J 5/20*  (2006.01)
(Continued)

(52) U.S. Cl.
CPC ................ *G01J 5/024* (2013.01); *G01J 5/22* (2013.01); *H04N 5/33* (2013.01); *G01J 2005/204* (2013.01)

(58) Field of Classification Search
CPC ........ G01J 5/024; G01J 5/22; G01J 2005/204; G01J 5/0853; G01J 5/20; G01J 2005/202; H04N 5/33
See application file for complete search history.

(56) References Cited

U.S. PATENT DOCUMENTS

2011/0267322 A1* 11/2011 Cole .................... G01J 5/0808
                                                                           345/205
2011/0315880 A1* 12/2011 Nemirovsky ......... G01J 1/4228
                                                                           438/54

FOREIGN PATENT DOCUMENTS

EP            1022551 A2    7/2000

OTHER PUBLICATIONS

International Search Report issued in PCT Patent Application No. PCT/FR2020/050763 dated Sep. 14, 2020.

* cited by examiner

*Primary Examiner* — David P Porta
*Assistant Examiner* — Meenakshi S Sahu
(74) *Attorney, Agent, or Firm* — MARSHALL, GERSTEIN & BORUN LLP

(57) ABSTRACT

An infrared imaging micro-bolometer integrates a membrane assembled in suspension on a substrate by support arms. The membrane includes an absorbing material configured to capture infrared radiations and a thermometric material connected to the absorbing material configured to perform a transduction of the infrared radiations captured by the absorbing material The thermometric material is arranged on a surface area smaller than 0.4 times a surface area of the membrane. The membrane also includes at least one central dielectric layer arranged between the absorbing material and the thermometric material. Recesses are formed (Continued)

in the absorbing material and in the at least one dielectric layer in portions of the membrane devoid of the thermometric material.

12 Claims, 5 Drawing Sheets

(51) Int. Cl.
*G01J 5/22* (2006.01)
*H04N 5/33* (2023.01)

LOW THERMAL CAPACITY MICRO-BOLOMETER AND ASSOCIATED MANUFACTURING METHOD

TECHNICAL FIELD

The present disclosure relates to the field of the detection of electromagnetic radiations and, more precisely, to the detection of infrared radiations. The invention concerns, on the one hand, the structure of a micro-bolometer having a membrane with a low thermal capacity, without for the absorption of the infrared flux to be impacted by this and, on the other hand, an associated forming method.

BACKGROUND

In the field of detectors implemented for infrared imaging, it is known to use devices arranged in an array, likely to operate at room temperature, that is, requiring no cooling to very low temperatures, conversely to detection devices called "quantum detectors" which require an operation at a very low temperature.

These detectors conventionally use the variation of a physical quantity of an appropriate material or assembly of materials, according to temperature, around 300 K. In the specific case of micro-bolometric detectors, which are the most currently used, this physical quantity is the electric resistivity, but other quantities may be used, such as the dielectric constant, the biasing, the thermal expansion, the refraction index, etc.

Such an uncooled detector generally associates:
means for absorbing the thermal radiation and for converting it into heat;
means for thermally insulating the detector, to enable it to heat up under the action of the thermal radiation;
thermometry means which, in the context of a micro-bolometric detector, use a resistive element having its resistance varying with temperature;
and means for reading the electric signals supplied by the thermometry means.

Detectors intended for thermal or infrared imaging are conventionally manufactured in the form of an array of elementary detectors, forming image points or pixels, in one or two dimensions. To guarantee the thermal insulation of the detectors, the latter are suspended above a substrate via support arms.

The substrate usually comprises means of sequential addressing of the elementary detectors and means of electrical excitation and of pre-processing of the electric signals generated from these elementary detectors. The substrate and the integrated means are commonly designated by the term "readout circuit".

To obtain a scene via this type of this detector, said scene is captured through an adapted optical system on the array of elementary detectors, and rated electric stimuli are applied via the readout circuit to each of the elementary detectors, or to each row of such detectors, to obtain an electric signal forming the image of the temperature reached by each of said elementary detectors. This signal is more or less elaborately processed by the readout circuit, and then possibly by an electronic device external to the package, to generate the thermal image of the observed scene.

More precisely, an elementary detector is formed of at least one thin membrane held in fixed suspension above the substrate. A "thin" membrane conventionally corresponds to a membrane having a total thickness in the order of from 0.1 to 0.5 micrometer.

The membrane integrates a thermometric material, which performs a transduction of the infrared radiations, forming the thermometry means. The volume of the thermometric material enables to adjust the signal-to-noise ratio during the measurement of the thermal resistance.

The measurement of the thermal resistance of the thermometric material is performed by an absorbing material, for example, metallic, extending under the thermometric material and in the support arms. In addition to the reading of the signal across the thermometric material, the absorbing material also has the function of absorbing the infrared flux to transmit it to the thermometric material. The quantity of absorbed infrared radiations is dependent on the surface area of this absorber.

To optimize the absorption of the infrared radiation, the absorbing material covers a maximum surface area in the pixel footprint. In practice, its surface area is limited by that of the membrane. The thickness of the absorbing material is adjusted so that its effective impedance per square is adapted to that of vacuum: $Z_0$=377 ohms. The absorber being typically solid to maximize its surface area, the square impedance of the layer of the absorber is then equal to $Z_0$. If the absorber was formed of an array of sub-lambda patterns having a filling rate equal to "tau", for example with a pattern of metal pads or a pattern of holes in a metal layer, the impedance of the metal layer forming the absorber would be equal to $Z_0$/tau. The adjustment of this impedance would thus be performed by a thickening of the metal layer.

To guarantee the electrical insulation between the thermometric material and the metallic absorbing material, a dielectric layer is arranged between these two materials. Two other dielectric layers may also be arranged on either side of the membrane to ensure the protection and the mechanical cohesion between the different materials.

For example, a membrane may be formed of a stack of a first silicon nitride dielectric layer having a 30-nanometer thickness, of a titanium nitride absorbing material having an 8-nanometer thickness, of a second silicon nitride dielectric layer having a 30-nanometer thickness, of an amorphous silicon thermoelectric material having a 100-nanometer thickness, and of a third silicon nitride dielectric material having a 30-nanometer thickness. Thus, the membrane has a 0.198-micrometer thickness. Of course, the materials may change and, for example, the absorbing material may be made of titanium or of platinum.

The membrane is held in suspension by means of support arms ensuring the holding and the thermal insulation between the membrane and the substrate. These support arms also ensure an electrical link between the contacts formed at the surface of the readout circuit and the electrically-active portions of the membrane. Conventionally, the membrane is held by two support arms since two electrical links are sufficient to sense the resistive value of the thermometry means and transmit this value to the readout circuit. To efficiently sense the temperature of the observed scene, it is not unusual to use a plurality of stacked membranes, the upper membrane being coupled to the lower membrane by one or a plurality of pillars.

However, the mass of the suspended elements has an influence upon the performance of the detector, in particular upon its signal-to-noise ratio and its time constant.

According to the invention, the signal-to-noise ratio is a quantity indicating the smallest temperature variation of the scene for which the detector is capable of generating a measurable response. The signal-to-noise ratio is currently expressed in mK. The time constant is associated with the time necessary for the detector to reach its thermal balance during a variation of the incident infrared power. The time constant is expressed in ms.

The mass of the membrane is tightly linked to its thermal capacity $C_{th}$ (or thermal mass), which is one of the key parameters operating on the time constant of the bolometer. Indeed, the time constant, noted $T_{th}$, is equal to the thermal resistance $R_{th}$ of the membrane multiplied by its thermal capacity $C_{th}$. Thus, for an equivalent thermal resistance, an increase in the thermal capacity of the membrane necessarily induces an increase in the time constant of the bolometer. The latter may be compensated for by a decrease in the thermal resistance but at the cost of a lower signal-to-noise ratio since the latter is directly proportional to the thermal resistance.

Thus, the design of a bolometer requires identifying an acceptable tradeoff between the signal-to-noise ratio and the time constant, and this tradeoff is greatly conditioned by the values of the thermal resistance and of the thermal capacity.

Indeed, the use of detectors having too low a time constant as compared with the rapidity of the events of the scene causes a degradation of the image, for example, the occurrence of phenomena of drag, fuzziness, or deformation of the observed object. Typically, with the previously-described membrane, it is possible to obtain a time constant in the order of 10 ms. Further, there exist many cases for which the bolometric detectors have a signal-to-noise ratio deficiency, in particular all defense applications intended for the remote detection and identification of targets.

An obvious solution to decrease the constraint on the tradeoff between the signal-to-noise ratio and the time constant comprises decreasing the thermal capacity of the membrane, but it has constraining limits.

Indeed, it is possible to decrease the thermal capacity by decreasing the thickness of the membrane. However, for mechanical hold reasons, the thickness of the membrane cannot be decreased below a limiting thickness, close to 0.1 micrometer. Further, it can be envisaged to decrease the lateral dimensions of the membrane but this solution causes an absorption deficiency associated with a decrease in the collection surface area of the absorber. The signal-to-noise ratio of the detector being directly proportional to its absorption, it would be all the more decreased.

The technical problem of the invention thus aims at decreasing the thermal capacity of a membrane of a micro-bolometer while limiting the degradation of the absorption of the infrared flow.

SUMMARY OF THE DISCLOSURE

The specification provides solving this technical problem by implementing a membrane integrating a thermometric material of reduced volume. More precisely, the invention provides a membrane having its thermometric material extending along a surface area smaller than that of the absorbing material. Of course, to decrease the volume of the thermometric material, it is also possible to decrease its thickness.

The decrease in the surface area of the thermometric material enables to form recesses in the portions of the membrane which are not in front of the surface having the thermometric material arranged thereon. The portions where the recesses are formed then comprise the absorbing material and at least one dielectric layer arranged between the absorbing material and the thermometric material.

In addition to the removal of the absorbing material at the level of the recesses, the dielectric layer is also removed at this level so that the mass of the membrane is decreased, thus improving its time constant.

Thus, according to a first aspect, the invention concerns an infrared imaging micro-bolometer integrating a membrane assembled in suspension above a substrate by means of support arms, the membrane comprising:

an absorbing material configured to capture infrared radiations;

a thermometric material connected to the absorbing material, and configured to perform a transduction of the infrared radiations captured by the absorbing material; and at least one central dielectric layer arranged between the absorbing material and the thermometric material.

The invention is characterized in that the surface area of the thermometric material is smaller than 0.4 time that of the membrane, and in that recesses are formed in the absorbing material and in the at least one central dielectric layer in areas of said membrane devoid of the thermometric material.

The invention enables to decrease the mass of the membrane due to the small volume of the thermometric material and to the presence of the recesses in the absorbing material and in the dielectric layer. Thus, the membrane has a lower thermal capacity than the membrane of prior art micro-bolometers and this, for a constant or more lightly decreased thermal resistance. As a result, the time constant is improved with respect to existing membranes with an equivalent signal-to-noise ratio. This reduction of the time constant improves the number of images capable of being acquired per second by a detector integrating micro-bolometers according to the invention.

With the invention, it is also possible to increase the signal-to-noise ratio while keeping a time constant equivalent to that of existing membranes. In this case, the thermal resistance is increased.

Further, the use of a thermometric material devoid of recesses or of perforations enables to guarantee the quality of the transduction performed by the thermometric material. Thermometric materials used in bolometry exhibit noise, a contribution thereof is the frequency noise. The latter increases inversely proportionally to the volume of the material, so that it can become predominating in thermometers of low volume.

Thus, in the context of the invention, the dimensions of the thermometer are adjusted to allow a strong decrease of the thermal capacity of the membrane and a negligible increase of the frequency noise.

According to an embodiment, the thermometric material is deposited above the absorbing material. The fact of depositing the absorbing material before the thermometric material enables this deposition step to form the electrodes present in the support arms between the anchor nails and the thermometric material. If the thermometric material is deposited under the absorbing material, the electric link between the anchor nails and the electrodes present in the support arms is more complex to form since larger layers of material have to be crossed.

It is also possible to arrange a second absorbing material with recesses above the thermometric material. This embodiment is particularly preferred when a large portion of the absorbing material is removed from portions of the membrane where the thermometric material is present.

Further, additional recesses may be formed in the absorbing material under the thermometric material. This embodiment enables to optimize the optical coupling of the absorber on a larger surface area. In this embodiment, the dielectric layer is not open-worked in the areas of the membrane where the thermometric material is present to ensure the support of the thermometric material.

Preferably, the thermometric material is made of vanadium oxide or of titanium oxide, so that the decrease of the surface area of the thermometric material does not adversely affect the quality of the output signal of the micro-bolometer.

It is often preferable to provide an upper dielectric layer deposited above the thermometric material to encapsulate it and passivate it. This upper dielectric layer may extend across the entire surface of the membrane and the recesses may also be formed through this upper dielectric layer to limit the mass of the membrane. Further, the absorbing material may also be protected by the use of a lower dielectric layer arranged under the absorbing material. In this embodiment, the recesses are preferably formed through this lower dielectric layer to further limit the mass of the membrane. These dielectric layers ensure the mechanical strength of the membrane and of the support arms. The thickness of these dielectric layers may be decreased to a minimum to further decrease the suspended mass and improve the temperature response time.

However, when these dielectric layers are thinned, there may exist problems of mechanical hold of the membrane by the support arms.

According to an embodiment, the membrane is supported by four support arms coupled, on the one hand to the membrane, and on the other hand, to four anchor nails rigidly attached to the substrate, to improve its mechanical stability and allow a more significant thinning of its dielectric layers. For example, with this embodiment, the thickness of the layers forming the stack may be of 10 nanometers for the lower, central, and upper dielectrics, and of 7 nanometers for the layer of absorbing material, so that the total thickness of the support arms is equal to 37 nanometers. Conversely, in the case of a pixel geometry with two support arms, the mechanical stability of the membrane imposes much greater thicknesses, that is, greater than 80 nanometers.

Advantageously, for a decrease of the time constant of the bolometer with an unchanged signal-to-noise ratio, the surface area of the thermometric material is greater than 0.1 time the surface area of the membrane. Indeed, if the surface area of the thermometric material is too small, and particularly smaller than 0.1 time the surface area of the membrane, there exist technological issues associated with the size of the contacting areas and with the forming of the patterns of the thermometric material.

Further, when the aim is to increase the signal-to-noise ratio of the micro-bolometer with an unchanged time constant, the ratio of the surface area of the thermometric material to the surface area of the membrane is advantageously between the same 10% and 40% values. When it is smaller than 10%, the thermal resistance necessary to obtain a nominal time constant and at an optimal sensitivity is greater than three times the thermal resistance used in the state of the art, which does not seem realistic with current technologies. When this ratio is greater than 40%, the potential sensitivity gain is smaller.

For example, for a 17×17 µm pixel, the membrane may have a surface area of 16×16 µm, that is, 256 µm². According to the invention, the surface area of the thermometric material must be smaller than 0.4 time the surface area of the membrane, that is, smaller than 76.8 µm². It is thus possible to use a thermometric material of square shape with a 8-µm side length, that is, a surface area of 64 µm².

The manufacturing of a membrane of a micro-bolometer is conventionally performed on a sacrificial layer so that the removal of this sacrificial layer enables to suspend the membrane above the substrate.

A first step of forming of the membrane comprises depositing the lower dielectric layer on the sacrificial layer. The absorbing material is then deposited on this lower dielectric layer. The central dielectric layer is then deposited on the absorbing material to electrically insulate the absorbing material from the thermometric material. Contact openings are then formed through the central dielectric layer.

The thermometric material is then locally deposited on the central dielectric layer and into the contact openings to electrically and thermally connect the thermometric material with the absorbing material. For example, after the deposition of the thermometric material, a step of photolithography and etching is carried out to structure the thermometric material so that its surface area is smaller than the surface area of the absorbing material.

When the thermometric material is deposited and structured, it is preferable to deposit an upper layer of dielectric material on the thermometric material before carrying out an etch step which defines the contour of each micro-bolometer as well as the support arms. It is possible, during this step, to hollow the portions of the membrane located outside of the area of the thermometric material.

Further, the fact of depositing the absorbing material before the thermometric material also enables this deposition step to form the electrodes present in the support arms between the anchor nails and the thermometric material. If the thermometric material is deposited under the absorbing material, the electric link between the anchor nails and the electrodes present in the support arms is more complex to form since larger layers of material have to be crossed.

The invention thus enables to limit the mass of the membrane without too significantly complicating the manufacturing process, since it is not necessary to implement an additional step.

The invention may be implemented for all known dimensions of imaging micro-bolometers, particularly imaging micro-bolometers forming pixels with a 17-µm pitch or a 12-µm pitch.

BRIEF DESCRIPTION OF THE DRAWINGS

The invention will be well understood on reading of the following description, the details of which are given as an example only, and developed in relation with the appended drawings, where identical references relate to identical elements.

Figure 1:
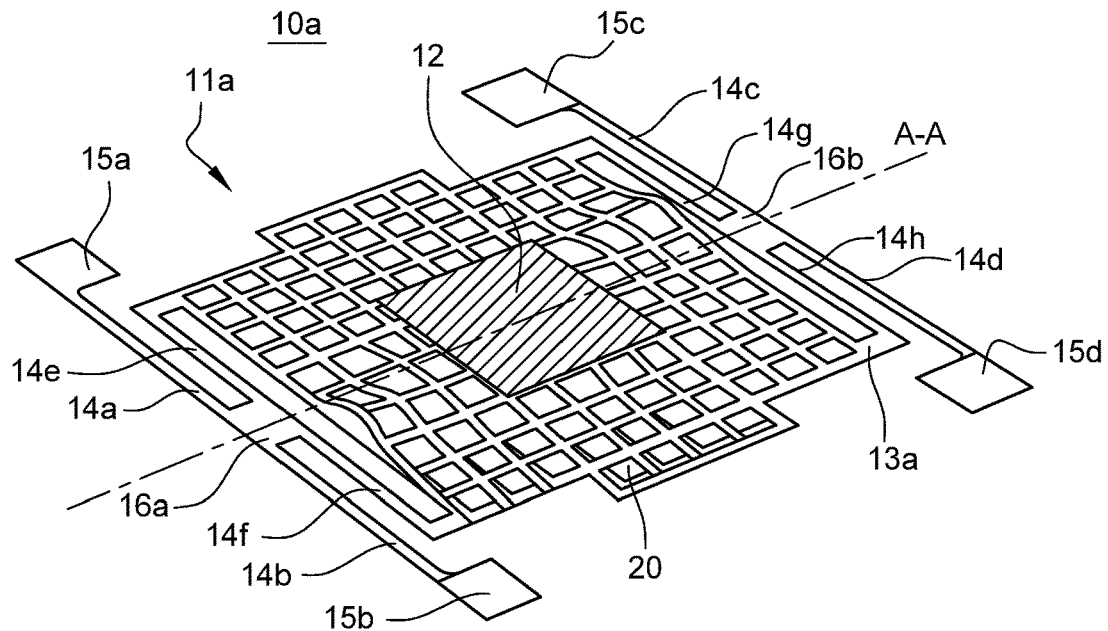
FIG. 1 is a perspective top view of an imaging micro-bolometer according to a first embodiment of the invention.
Figure 8:
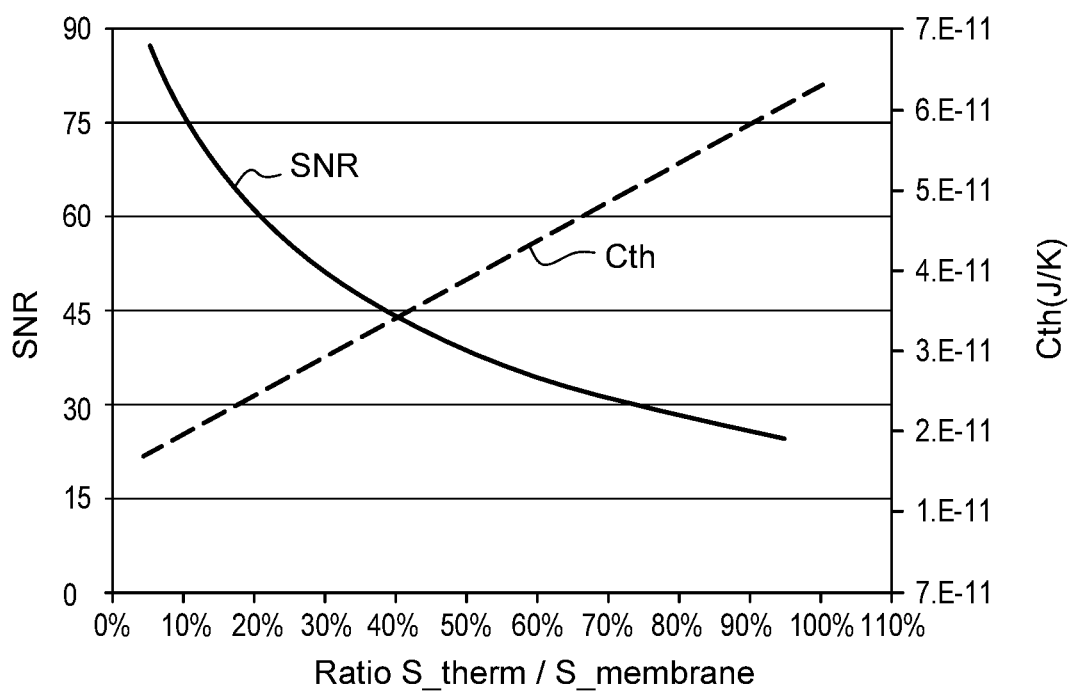
Figure 9:
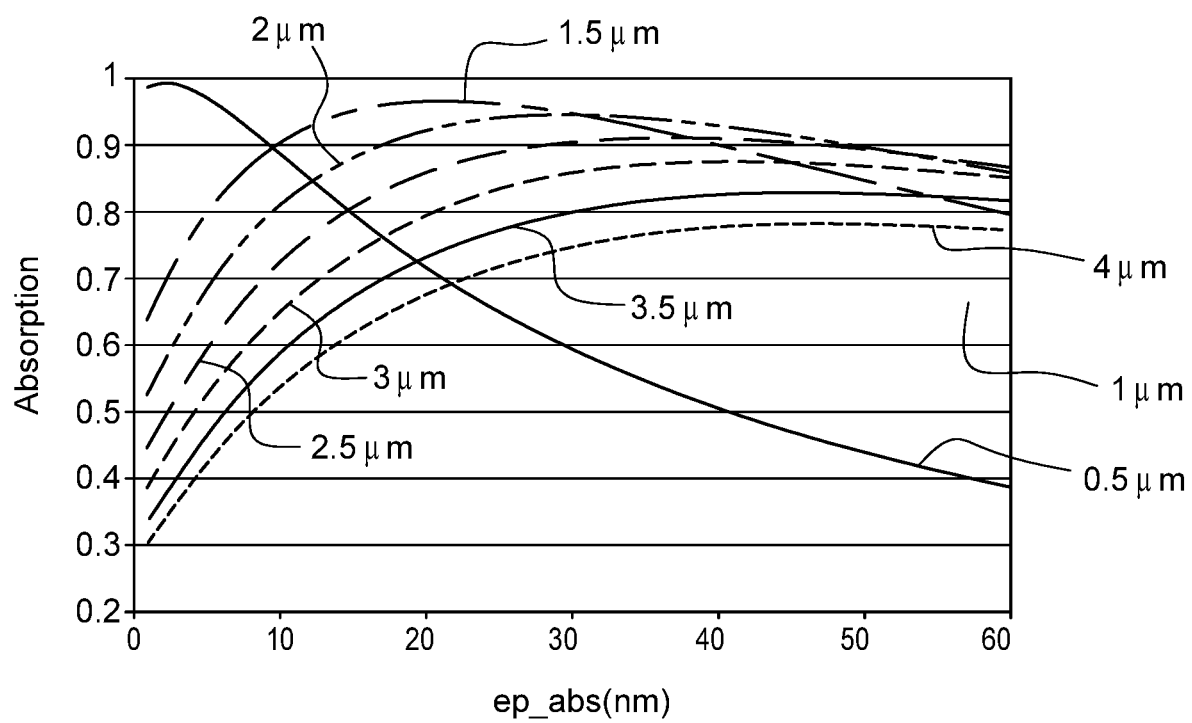

FIG. 8 is a simplified representation of the variation, for a specific time constant, of the signal-to-noise ratio and of the thermal capacity of the micro-bolometer of FIG. 1 according to the ratio of the surface area of the thermometric material to that of the membrane; and FIG. 9 is a simplified representation of the absorption efficiency of an absorbing layer according to its thickness and for different repetition pitches of the pattern forming it.

DETAILED DESCRIPTION

FIG. 1 illustrates an imaging micro-bolometer 10a according to the invention during a simulation of the deformations of its membrane 11a. This membrane 11a is assembled in suspension above a substrate 30. For this purpose, four anchor nails 15a-15d are attached to a substrate 30 and extend perpendicularly thereto. The example described in FIG. 1 is non-limiting and the invention may be implemented with only two anchor nails and two support arms. The structure of FIG. 1 is advantageous since the use of four anchor nails 15a-15d and of four support arms 14a-14h enables to thin membrane 11a by limiting its mechanical deformation, and thus as a corollary, to decrease its mass.

Each support arm 14a-14h is formed of two portions coupled by a bearing 16a-16b common to two support arms 14a-14h. More precisely, a first portion 14a of a first support arm is coupled on the anchor nail 15a located at the top left of membrane 11a, and this first portion 14a is connected to a bearing 16a arranged to the left of membrane 11a.

Parallel to this first portion 14a, a second portion 14e extends from bearing 16a to reach the top left corner of membrane 11a. This bearing 16a is also coupled to a second anchor nail 15b by means of a first portion 14b of a second arm. A second portion 14f of this second arm extends parallel to this first portion 14b of this second arm to reach the bottom left corner of membrane 11a. Similarly, on the right-hand side of membrane 11a, a first portion 14c of a third support arm extends between a third anchor nail 15c and a bearing 16b. A second portion 14g of this third arm extends parallel to the first portion 14c of this third arm to reach the top right corner of membrane 11a. The last support arm is formed by a first portion 14d extending between bearing 16b and the last anchor nail 15d as well as a second portion 14h extending parallel to the first portion of this fourth support arm between bearing 16b and the bottom right corner of membrane 11a. Membrane 11a is thus suspended by these four corners.

Figure 3:
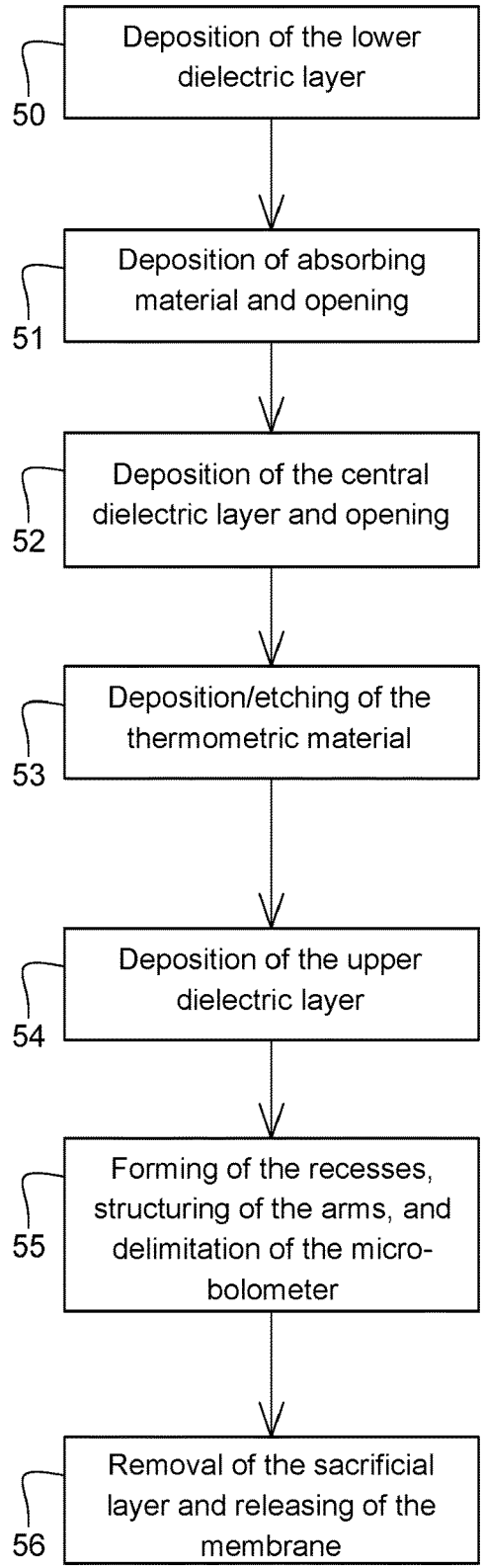
FIG. 3 is a flowchart of the membrane of FIG. 1 with successive cross-section view of this membrane along axis A-A.
Figure 3:
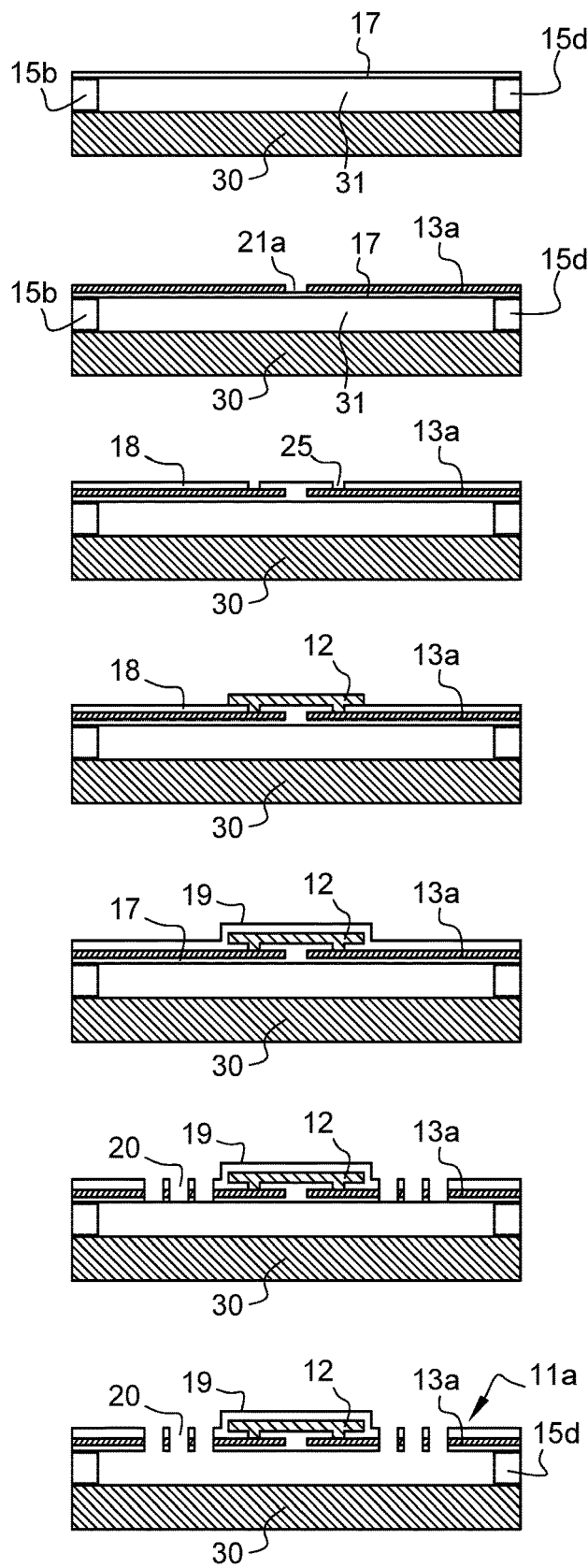

As illustrated in FIG. 3, membrane 11a may be formed by a step 50 of deposition of a lower dielectric layer 17 on a sacrificial layer 31. This lower dielectric layer 17 is not necessary to carry out the invention but enables to protect absorbing material 13a on removal of sacrificial layer 31.

Figure 2:
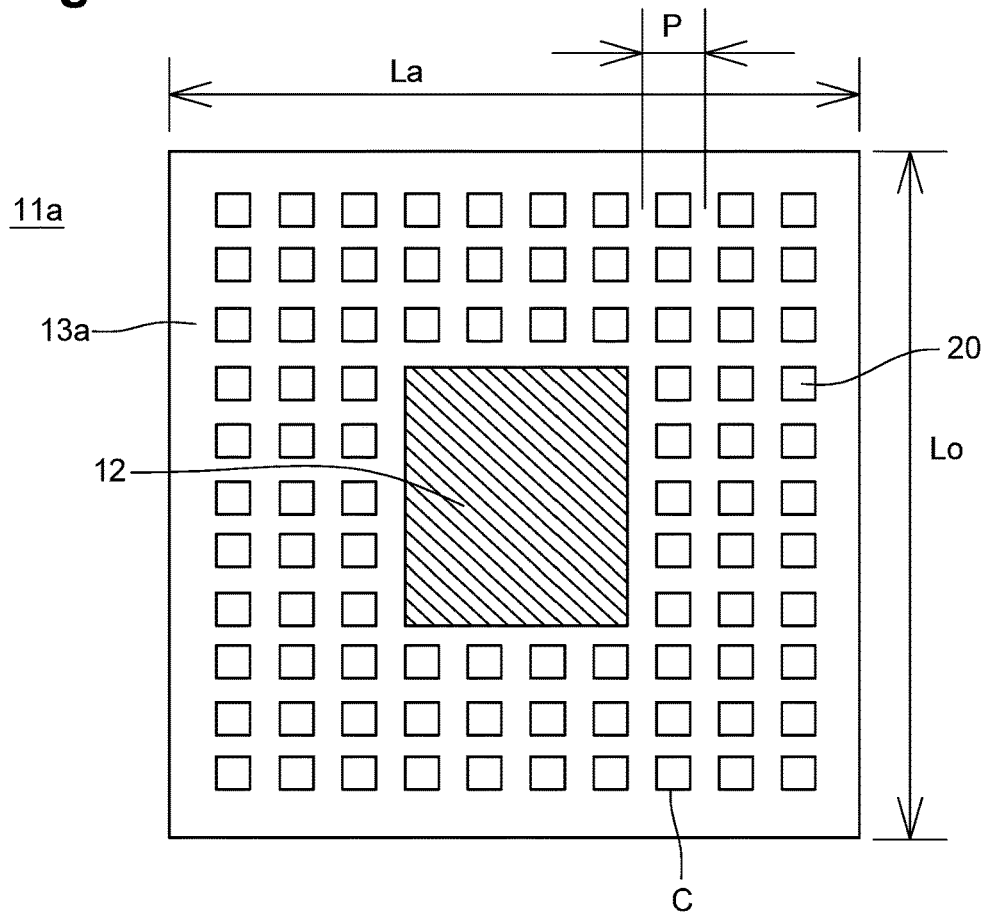
FIG. 2 is a top view of the membrane of the micro-bolometer of FIG. 1.

For example, the dielectric layers 17-19 used to form membrane 11a may be made of silicon nitride. In the example of FIGS. 1 and 2, these dielectric layers 17-19 are translucent and enable to observe thermometric material 12 and absorbing material 13a.

After the deposition of lower dielectric layer 17, the method of manufacturing membrane 11a comprises a step 51 of deposition of absorbing material 13a. This step includes a structuring of the absorbing material 13a by creating one or a plurality of openings 21a to electrically separate the two electrodes formed by the two portions of absorbing material 13a. In the example of FIG. 3, a single opening 21a is created. As illustrated in FIG. 2, absorbing material 13a preferably has a length Lo and a width La equivalent to the length and to the width of membrane 11a. The deposition of absorbing material 13a is thus formed over the entire surface of membrane 11a. Absorbing material 13a is conventionally metallic, such as titanium nitride. After the deposition of absorbing material 13a, the deposition of a central dielectric layer 18 is performed, during a step 52, to electrically insulate the absorbing material 13a of thermometric material 12. This central dielectric layer 18 is deposited over the entire surface of absorbing material 13a. This central dielectric layer 18 is also structured to form at least two openings 25 to obtain electric contacts between absorbing material 13a and thermometric material 12.

The method of forming membrane 11a carries on with a step 53 of deposition of the thermometric material 12 on central dielectric layer 18 and in openings 25. This deposition step is specific to the invention since thermometric material 12 is not conventionally arranged over the entire surface of central electric layer 18, but only over a portion thereof.

For example, as illustrated in FIGS. 1 to 4, thermometric 12 may be deposited on a cuboid surface centered on the length Lo and the width La of membrane 11a. As a variant, other shapes and other positionings of thermometric material 12 are possible.

The central positioning of thermometric material 12 however enables to simplify the calculation of the resistance necessary for support arm 14a-14h to support membrane 11a.

Thermometric material 12 may be made in all known materials, such as amorphous silicon. Preferably, thermometric material 12 is made of vanadium oxide or of titanium oxide to be able to decrease as much as possible its surface area without too strongly degrading the signal-to-noise ratio of the imaging micro-bolometer. The surface area of thermometric material 12 may for example be in the range from 10% to 40% of the surface area of membrane 11a.

After local deposition of thermoelectric material 12, it is preferable to deposit, at a step 54, an upper dielectric layer 19 to protect thermometric material 12. Upper dielectric layer 19 is deposited both on thermometric material 12 and on central dielectric layer 18 to cover the entire surface of membrane 11a.

The decrease in the surface area of thermometric material 12 enables to form recesses 20 through the portions of membrane 11a which are not arranged in front of thermometric material 12.

Preferably, the forming of these recesses 20 is performed during a step 55 of structuring of support arms 14a-14h and of delimitation of imaging bolometer 10a. The delimitation of imaging micro-bolometer 10a aims at separating the pixels from one another when a detector is formed with an assembly of imaging micro-bolometers 10a forming the different pixels.

The last step 56 of forming of membrane 11a comprises removing sacrificial layer 31 to suspend membrane 11a above substrate 30.

Recesses 20 may take various patterns but it is preferably for the geometry of the repeated patterns to be unchanged after a rotation of 90° around an axis normal to the plane of membrane 11a to ensure an insensitivity of the detector to the two polarizations of light. The thickness of absorbing material 13a must be determined according to its filling rate in the portions of the membrane where recesses 20 are formed.

Further, these recesses 20 are preferably organized in the form of an array network having a pitch P of a length C much smaller than the wavelength desired by absorbing material 13*a*.

Typically, the recesses 20 illustrated in FIGS. 1 and 2 are square-shaped with a length C in the range from 0.7 to 1.2 micrometer. These recesses 20 are configured in the form of an array network with a pitch P in the range from 0.6 to 1.2 micrometer.

FIG. 9 illustrates the absorption efficiency of a layer of absorbing material 13*a* formed of periodic patterns according to its thickness, noted ep_abs, and for different repetition pitches varying from 0.5 to 4 micrometers. These results originate from simulations where the periodic pattern of absorbing material 13*a* is a cross with horizontal and vertical branches having a 300-nanometer side length and for a 10-micrometer wavelength. FIG. 9 shows that the pitch between two patterns of this network is advantageously in the range from 0.5 to 3 micrometers; in this case, the adjustment of the thickness of the absorber allow an absorption efficiency greater than 85% at the 10-micrometer wavelength.

The increase of the surface area of the recesses formed within absorbing material 13*a* and dielectric layers 17-19 enables to limit the mass of membrane 11*a*. However, this increase also decreases the capture capacities of absorbing material 13*a* as well as the mechanical resistance provided by dielectric layers 17-19. To keep satisfactory capture properties, the recesses are arranged in an array having a pitch smaller than the wavelength of interest for absorbing material 12.

Thus, due to the presence of the recesses formed within absorbing material 13*a* outside of the area occupied by thermometric material 12, absorbing material 13*a* must have a thickness in the order of 18 nanometers, in the case of the above numerical example of an absorbing material 13*a* having a filling rate of 33%. In other words, this thickness must be greater than the optimal thickness of the absorbing material 13*a* located in front of or vertically in line with thermometric material 12 which, at this level would be in the order of 8 nanometers since, as mentioned hereabove, absorbing material 13*a* comprises no recess in this specific area. In the opposite case, the adaptation of absorbing material 13*a* is not efficient.

Figure 5:
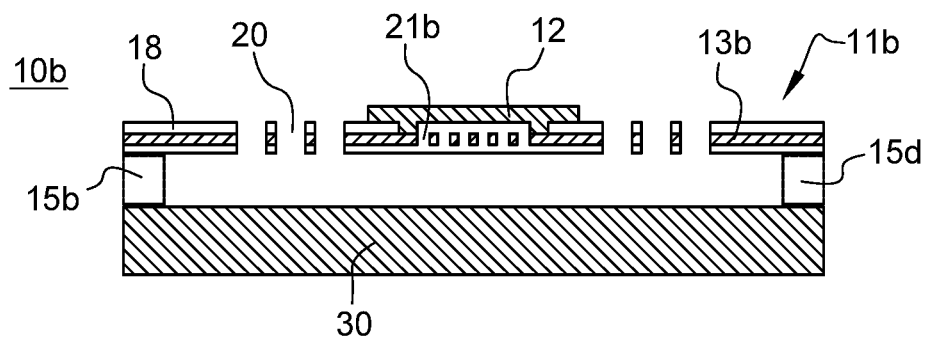
FIG. 5 is a cross-section view of an imaging micro-bolometer according to a second embodiment of the invention.

To suppress this problem, as illustrated in FIG. 5, it is possible to only perforate absorbing material 13*b* in the area of thermometric material 12 with an array of recesses 21*b*. Thus, in the embodiment of FIG. 5, layers of dielectric materials 17-19 are not perforated in the portions of membrane 11*b* where thermometric material 12 is present. The gain generated on the mass of membrane 11*b* is negligible, but this embodiment enables to obtain a micro-bolometer 10*b* having a strictly uniform and optimized absorption with a metal thickness defined to adapt on the portions of membrane 11*b* where thermometric material 12 is present, typically 12-18 nanometers.

Figure 4:
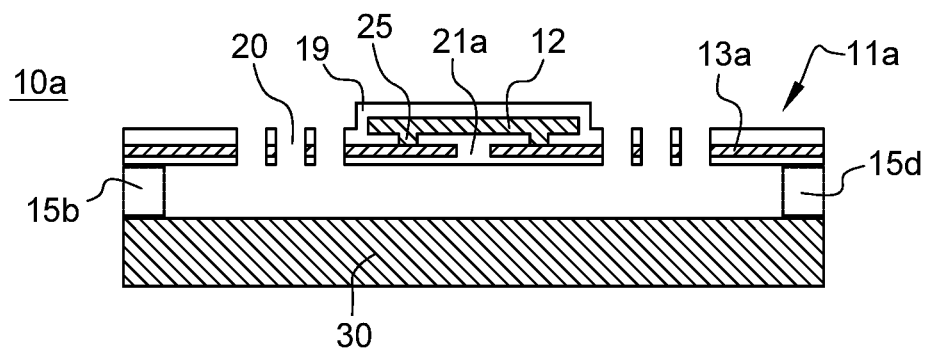
FIG. 4 is a cross-section view of the micro-bolometer of FIG. 1.

Further, the embodiment of FIG. 5 also provides not using an upper dielectric layer 19 as compared with the embodiment of FIG. 4. As a variant, upper dielectric layer 19 may also be suppressed in the embodiment of FIG. 4 or added to the embodiment of FIG. 5.

Figure 6:
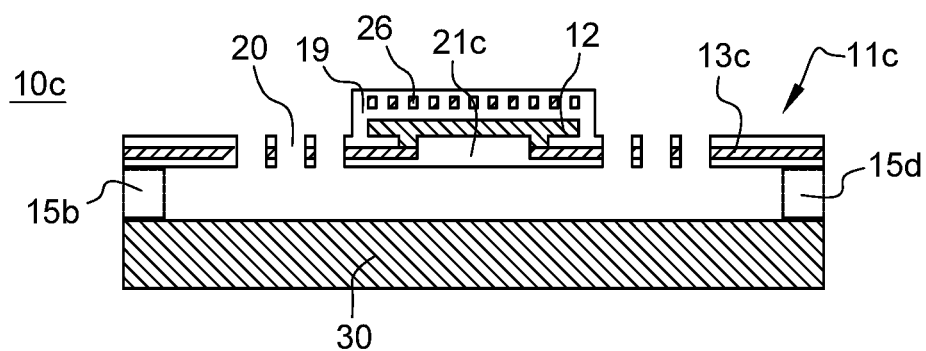
FIG. 6 is a cross-section view of an imaging micro-bolometer according to a third embodiment of the invention.

It is also possible, as illustrated in FIG. 6, to remove a large portion of absorbing material 13*c* from the area of thermometric material 12 with a recess 21*c* having a large surface area. The only remaining portion of absorbing material 13*c* is that enabling to form connections 25 with thermometric material 12. In this embodiment, micro-bolometer 10*c* also comprises a membrane 11*c* integrating an additional absorbing material 26 arranged above thermometric material 12 to overcome the lack of absorbing material under thermometric material 12. This additional absorbing material 26 is also perforated without perforating thermometric material 12.

Thus, in the embodiments of FIGS. 4 and 6, absorbing material 13*a*, 13*c* efficiently captures infrared radiations, even if the adaptation is only optimized on the portions of membrane 11*a*-11*c* which are not in front of the surface of thermometric material 12, that is, if the absorbing material only has a thickness in the order of 18 nm. In the embodiment of FIG. 5, the gain generated on the mass of membrane 11*b* is negligible, but this embodiment enables to obtain a micro-bolometer 10*b* having a strictly uniform and optimized absorption with a metal thickness defined to adapt on the portions of membrane 11*b* where thermometric material 12 is present.

The invention thus enables to obtain a membrane 11*a*-11*c* with a particularly small mass, which improves the thermal capacity of this membrane.

Figure 7:
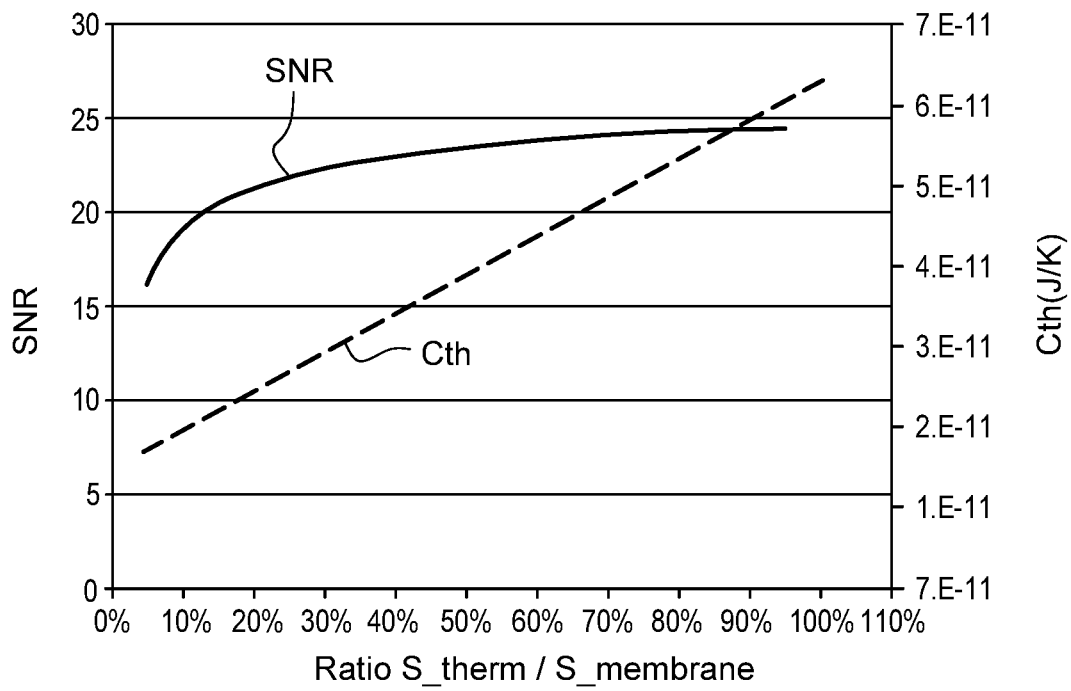
FIG. 7 is a simplified representation of the variation, for a constant thermal resistance, of the signal-to-noise ratio and of the thermal capacity of the micro-bolometer of FIG. 1 according to the ratio of the surface area of the thermometric material to that of the membrane.

FIG. 7 illustrates, for a same thermal resistance value $R_{th}$, the variation of the signal-to-noise ratio, also called SNR, of a micro-bolometer 10*a*, in accordance with that of FIGS. 1 to 4. FIG. 7 also illustrates the variation of the thermal capacity Cth of membrane 11*a* according to the ratio of the surface area of thermometric material 12, noted $S_{therm}$, to that of membrane 11*a*, noted $S_{membrane}$.

For ratios $S_{therm}/S_{membrane}$ in the range from 10% to 40%, the SNR of micro-bolometer 10*a* exhibits a relatively light degradation, in the range from 6% to 25% while, meanwhile, the thermal capacity Cth of membrane 11*a* is decreased by from 46% to 68%. Thus, the invention enables to more strongly decrease the thermal capacity Cth of membrane 11*a* than the signal-to-noise ratio of micro-bolometer 10*a*. FIG. 7 also illustrates the fact that the invention enables to reach low time constants associated with signal-to-noise ratios close to the state of the art.

Further, it is possible to obtain values of the signal-to-noise ratio equal to those of the state of the art by an adjustment of the thermal resistance, for example, while keeping a low time constant. Finally, the development of thermometric materials 12 currently enables to have materials with a high signal-to-noise ratio, which is an additional lever to compensate for the sensitivity loss associated with the decrease in the volume of thermometric material 12.

FIG. 8 illustrates, for a same time constant value, and thus for different thermal resistance values $R_{th}$, the variation of the signal-to-noise ratio of micro-bolometer 10*a* and that of the thermal capacity Cth of membrane 11*a* according to ratio $S_{therm}/S_{membrane}$. This FIG. 8 illustrates the fact that the invention combined with an increase in thermal resistance $R_{th}$ enables to form detectors of high sensitivity and with a time constant close to the state of the art. For example, in the case of a thermometric material 12 having a ratio $S_{therm}/S_{membrane}$ equal to 30%, the signal-to-noise ratio of micro-bolometer 10*a* may be doubled if the resistance is adjusted upward.

The invention has been tested with a vanadium oxide thermometric material 12 and the use of three dielectric layers 17-19 such as illustrated in FIG. 3. The ratio of the surface area of thermometric material 12 to the surface of membrane 11 is substantially 20%, and recesses 20 have been formed with a 0.8-micrometer length and a 1.2-micrometer pitch. These tests have enabled to highlight a temperature response time in the order of 3 ms, which is a highly significant improvement over prior art imaging micro-bolometers, which have a temperature response time in the order of 10 ms and a sensitivity in accordance with the state of the art.

The gain obtained by the invention is thus very high and enables to envisage new applications for imaging micro-bolometers, such as the capture of fast images or the more efficient tracking of elements in a scene.

The invention claimed is:

1. Infrared imaging micro-bolometer integrating a membrane assembled in suspension above a substrate by support arms, the membrane comprising:
   an absorbing material configured to capture infrared radiations;
   a thermometric material connected to the absorbing material configured to perform a transduction of the infrared radiations captured by said absorbing material; and
   at least one central dielectric layer arranged between the absorbing material and the thermometric material;
   wherein a surface of the thermometric material is smaller than 0.4 time the surface area of the membrane, and
   wherein recesses are formed in the absorbing material and in the at least one central dielectric layer in areas of the membrane devoid of the thermometric material.

2. Infrared imaging micro-bolometer according to claim 1, wherein the thermometric material is deposited above the absorbing material.

3. Infrared imaging micro-bolometer according to claim 2, wherein a second absorbing material provided with recesses is arranged above said thermometric material.

4. Infrared imaging micro-bolometer according to claim 1, wherein additional recesses are restrictively formed in said absorbing material, including in areas of the membrane where said thermometric material is present.

5. Infrared imaging micro-bolometer according to claim 1, wherein the thermometric material is made of vanadium oxide or of titanium oxide.

6. Infrared imaging micro-bolometer according to claim 1, wherein the membrane also comprises an upper dielectric layer arranged on the thermometric material and extending over the surface of a central dielectric layer, the recesses crossing said upper dielectric layer.

7. Infrared imaging micro-bolometer according to claim 1, wherein the membrane also comprises a lower dielectric layer arranged under the absorbing material and extending all over the surface of the absorbing material, the recesses crossing said lower dielectric layer.

8. Infrared imaging micro-bolometer according to claim 1, wherein the suspension of the membrane above the substrate is performed by means of four support arms coupled, on the one hand, to the membrane and, on the other hand, to four anchor nails rigidly attached to the substrate.

9. Imaging micro-bolometer according to claim 1, wherein the surface area of the thermometric material is greater than 0.1 time the surface area of the membrane.

10. A method of forming an infrared imaging micro-bolometer comprising the steps of:
    structuring of at least two anchor nails on a substrate;
    deposition of a sacrificial layer on the substrate;
    deposition of a lower dielectric layer on the sacrificial layer;
    deposition of an absorbing material on the lower dielectric layer so that the absorbing material is electrically connected to the anchor nails;
    deposition of a central dielectric layer on said absorbing material;
    local deposition of a thermometric material so that the surface area of said thermometric material is smaller than 0.4 time the surface area of the membrane;
    forming of recesses through the dielectric layers and the absorbing material in portions which are not in front of or vertically in line with the thermometric material;
    structuring of the support arms and delimiting of the imaging micro-bolometer; and
    suppression of the sacrificial layer.

11. The method of forming an infrared imaging micro-bolometer according to claim 10, wherein the steps of forming of the recesses, of structuring of the support arms, and of delimiting of the imaging micro-bolometer are simultaneously performed by an etch step.

12. The method of forming an infrared imaging micro-bolometer according to claim 10, wherein the method also comprises a step of deposition of an upper dielectric layer on said thermometric material and on the central dielectric layer.

* * * * *